United States Patent
Wang et al.

(10) Patent No.: US 12,190,409 B2
(45) Date of Patent: Jan. 7, 2025

(54) METHOD, DEVICE, AND COMPUTER PROGRAM PRODUCT FOR PROCESSING DATA

(71) Applicant: Dell Products L.P., Round Rock, TX (US)

(72) Inventors: Zijia Wang, WeiFang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 17/984,400

(22) Filed: Nov. 10, 2022

(65) Prior Publication Data

US 2024/0135599 A1  Apr. 25, 2024
US 2024/0233200 A9  Jul. 11, 2024

(30) Foreign Application Priority Data

Oct. 20, 2022 (CN) .......................... 202211287337.6

(51) Int. Cl.
| | |
|---|---|
| *G06T 11/00* | (2006.01) |
| *G06F 40/20* | (2020.01) |
| *G06F 40/30* | (2020.01) |
| *G06N 3/08* | (2023.01) |

(52) U.S. Cl.
CPC .............. *G06T 11/00* (2013.01); *G06F 40/20* (2020.01); *G06N 3/08* (2013.01); *G06F 40/30* (2020.01)

(58) Field of Classification Search
CPC .......... G06T 11/00; G06F 40/20; G06F 40/30; G06N 3/08; G06N 3/084; G06V 10/82
See application file for complete search history.

(56) References Cited

U.S. PATENT DOCUMENTS

| | | | |
|---|---|---|---|
| 2022/0198729 A1* | 6/2022 | Duffy ...................... | G06F 40/20 |
| 2022/0300697 A1* | 9/2022 | Li .......................... | G06T 11/001 |
| 2023/0081171 A1* | 3/2023 | Zhang .................... | G06V 10/82 |
| | | | 382/157 |

(Continued)

OTHER PUBLICATIONS

A. Vaswani et al., "Attention Is All You Need," Conference on Neural Information Processing Systems, arXiv:1706.03762v5, Dec. 6, 2017, 15 pages.

(Continued)

*Primary Examiner* — Jitesh Patel
(74) *Attorney, Agent, or Firm* — Ryan, Mason & Lewis, LLP (57) ABSTRACT

Embodiments of the present disclosure relate to a method, a device, and a computer program product for processing data. The method includes determining, based on acquired text, character features for a group of characters in the text and text features for the text. The method further includes determining initial visual features for the text based on the text features. The method further includes determining target visual features for the text based on the initial visual features, the character features, and the text features. The method further includes generating a target image corresponding to the text based on the target visual features. Through the method, the accuracy of conversion between text and an image is improved, the data processing efficiency is improved, and the data compression efficiency is further improved.

20 Claims, 6 Drawing Sheets

(56) References Cited

U.S. PATENT DOCUMENTS

| | | | | |
|---|---|---|---|---|
| 2023/0162490 A1* | 5/2023 | Zhang | ............... | G06V 10/82 |
| | | | | 382/159 |
| 2023/0215162 A1* | 7/2023 | Kim | ............... | G06V 10/86 |
| | | | | 382/157 |
| 2023/0245418 A1* | 8/2023 | Zhang | ............... | G06V 10/82 |
| | | | | 382/156 |
| 2023/0326489 A1* | 10/2023 | Liu | ............... | G06T 11/60 |
| | | | | 386/209 |
| 2024/0126807 A1* | 4/2024 | Kharbanda | ............... | G06F 16/54 |

OTHER PUBLICATIONS

E. Mansimov et al., "Generating Images from Captions with Attention," International Conference on Learning Representations, arXiv:1511.02793v2, Feb. 29, 2016, 12 pages.

A. Nguyen et al., "Plug & Play Generative Networks: Conditional Iterative Generation of Images in Latent Space," IEEE Conference on Computer Vision and Pattern Recognition, arXiv:1612.00005v2, Apr. 12, 2017, 36 pages.

S. Reed et al., "Parallel Multiscale Autoregressive Density Estimation," International Conference on Machine Learning, arXiv:1703.03664v1, Mar. 10, 2017, 16 pages.

S. Reed et al., "Generative Adversarial Text to Image Synthesis," International Conference on Machine Learning, arXiv:1605.05396v2, Jun. 5, 2016, 10 pages.

S. Reed et al., "Learning What and Where to Draw," Conference on Neural Information Processing Systems, arXiv:1610.02454v1, Oct. 8, 2016, 9 pages.

H. Zhang et al., "StackGAN: Text to Photo-realistic Image Synthesis with Stacked Generative Adversarial Networks," International Conference on Computer Vision, arXiv:1612.03242v2, Aug. 5, 2017, 14 pages.

T. Xu et al., "AttnGAN: Fine-Grained Text to Image Generation with Attentional Generative Adversarial Networks," IEEE Conference on Computer Vision and Pattern Recognition, arXiv:1711.10485v1, Nov. 28, 2017, 9 pages.

A. Karpathy et al., "Deep Visual-Semantic Alignments for Generating Image Descriptions," IEEE Conference on Computer Vision and Pattern Recognition, arXiv:1412.2306v2, Apr. 14, 2015, 17 pages.

T. Salimans et al., "Improved Techniques for Training GANs," Conference on Neural Information Processing Systems, Dec. 2016, 9 pages.

H. Zhang et al., "StackGAN++: Realistic Image Synthesis with Stacked Generative Adversarial Networks," IEEE Transactions on Pattern Analysis and Machine Intelligence, arXiv:1710.10916v3, Jun. 28, 2018, 16 pages.

* cited by examiner

METHOD, DEVICE, AND COMPUTER PROGRAM PRODUCT FOR PROCESSING DATA

RELATED APPLICATION(S)

The present application claims priority to Chinese Patent Application No. 202211287337.6, filed Oct. 20, 2022, and entitled "Method, Device, and Computer Program Product for Processing Data," which is incorporated by reference herein in its entirety.

FIELD

Embodiments of the present disclosure generally relate to the field of data processing, and in particular, to a method, a device, and a computer program product for processing data.

BACKGROUND

With the ongoing development of data processing technologies, more and more data related to images is processed. For example, in a virtual world scenario, the amount of image data that needs to be transmitted is growing. If the image data is transmitted directly, significant amounts of computing resources and network resources are required. In order to reduce the use of these resources, the image data is usually subjected to lossy compression or lossless compression. The compressed data is then transmitted to other devices for rendering. However, there are still many problems to be solved in processing image data.

SUMMARY

Embodiments of the present disclosure provide a method, a device, and a computer program product for processing data.

According to a first aspect of the present disclosure, a method for processing data is provided. The method includes determining, based on acquired text, character features for a group of characters in the text and text features for the text. The method further includes determining initial visual features for the text based on the text features. The method further includes determining target visual features for the text based on the initial visual features, the character features, and the text features. The method further includes generating a target image corresponding to the text based on the target visual features.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to execute actions including: determining, based on acquired text, character features for a group of characters in the text and text features for the text; determining initial visual features for the text based on the text features; determining target visual features for the text based on the initial visual features, the character features, and the text features; and generating a target image corresponding to the text based on the target visual features.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, it may be necessary to compress image data to be transmitted. However, an appropriate compression technology is needed when compressing the image data. Moreover, this compression technology can require significant amounts of computing resources and transmission resources.

Now, with the development of neural network models, there are many solutions that can generate an image through text and solutions that can generate text from an image, thereby achieving data compression and transmission. However, since these models are still at the research stage, the calculation accuracy thereof is not high, and the data processing efficiency is not high either.

In order to solve at least the above and other potential problems, an embodiment of the present disclosure provides a method for processing image data. The method may obtain an image through text, and then can generate corresponding text based on the image. Therefore, when an image is compressed, corresponding text may be acquired first from the image, then only the text is transmitted, and a corresponding image is generated through the text at a receiver. With the method, the accuracy of generating an image from text or generating text from an image is improved, the data processing efficiency is improved, and the data compression efficiency is further improved.

Embodiments of the present disclosure will be further described in detail with reference to the accompanying drawings below.

Figure 1:
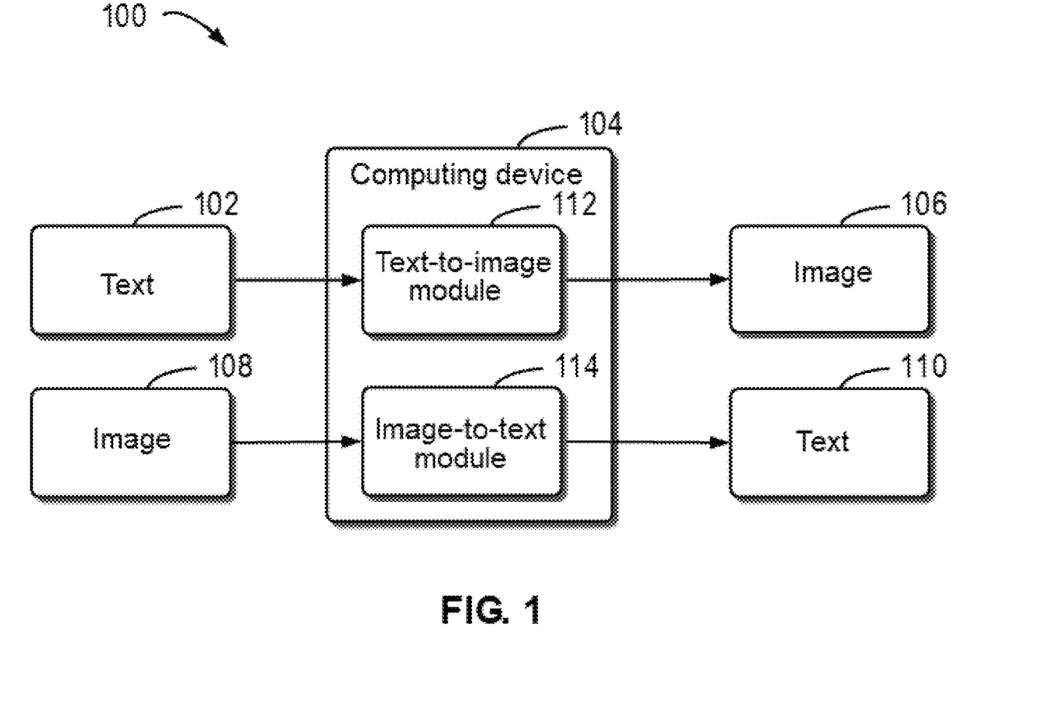
FIG. 1 illustrates a schematic diagram of an example environment in which a device and/or a method according to embodiments of the present disclosure can be implemented.

FIG. 1 shows an example environment 100 in which a device and/or a method according to embodiments of the present disclosure can be implemented. As shown in FIG. 1, example environment 100 includes computing device 104, and computing device 104 may convert input text into an image or convert an input image into text.

Example computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 104 includes text-to-image module 112. Text-to-image module 112 converts text 102 received by the computing device into a corresponding image 106. For example, if text 102 is "red sunset," image 106 including a red sunset may be obtained after the processing by text-to-image module 112. In one example, the text-to-image module 112 is implemented by a neural network model. In another example, there is a mapping relationship between text and images in the text-to-image module 112, and then the mapping relationship is used for obtaining the image corresponding to the text. The above examples are intended to describe the present disclosure only and are not specific limitations to the present disclosure. An example of text-to-image module 112 will be further described below with reference to FIG. 2.

Computing device 104 further includes image-to-text module 114. Image-to-text module 114 is used for converting acquired image 108 into text 110, and this process is equivalent to realizing image compression. In one example, image-to-text module 114 is implemented by a neural network model. In another example, there is a mapping relationship between images and text in image-to-text module 114, and then the mapping relationship is used for obtaining the text corresponding to the image. The above examples are intended to describe the present disclosure only and are not specific limitations to the present disclosure. An example of image-to-text module 114 will be further described with reference to FIG. 4.

It is shown in FIG. 1 that computing device 104 includes text-to-image module 112 and image-to-text module 114, which is only an example and not a specific limitation to the present disclosure. Text-to-image module 112 and image-to-text module 114 may be distributed in different devices.

It is shown in FIG. 1 that the computing device receives text 102 and image 108 from other devices, which is only an example and not a specific limitation to the present disclosure. Computing device 104 may also acquire text 102 or image 108 from its local storage device.

Further, computing device 104 may further train the text-to-image module 112 and the image-to-text module 114. Alternatively or additionally, computing device 104 may jointly train the text-to-image module 112 and the image-to-text module 114. Alternatively, the joint training of text-to-image module 112 and image-to-text module 114 may be performed on any other suitable computing device.

It should be understood that the architecture and functions of example environment 100 are described for illustrative purposes only, without implying any limitation to the scope of the present disclosure. Embodiments of the present disclosure may also be applied to other environments having different structures and/or functions.

With the method, the accuracy of generating an image from text or generating text from an image is improved, the data processing efficiency is improved, and the data compression efficiency is further improved.

An example environment in which a device and/or a method according to embodiments of the present disclosure can be implemented has been described above in FIG. 1. A schematic diagram of an example of a text-to-image module is further described below with reference to FIG. 2, wherein FIG. 2 illustrates a schematic structural diagram 200 of a text-to-image module according to an embodiment of the present disclosure.

Figure 2:
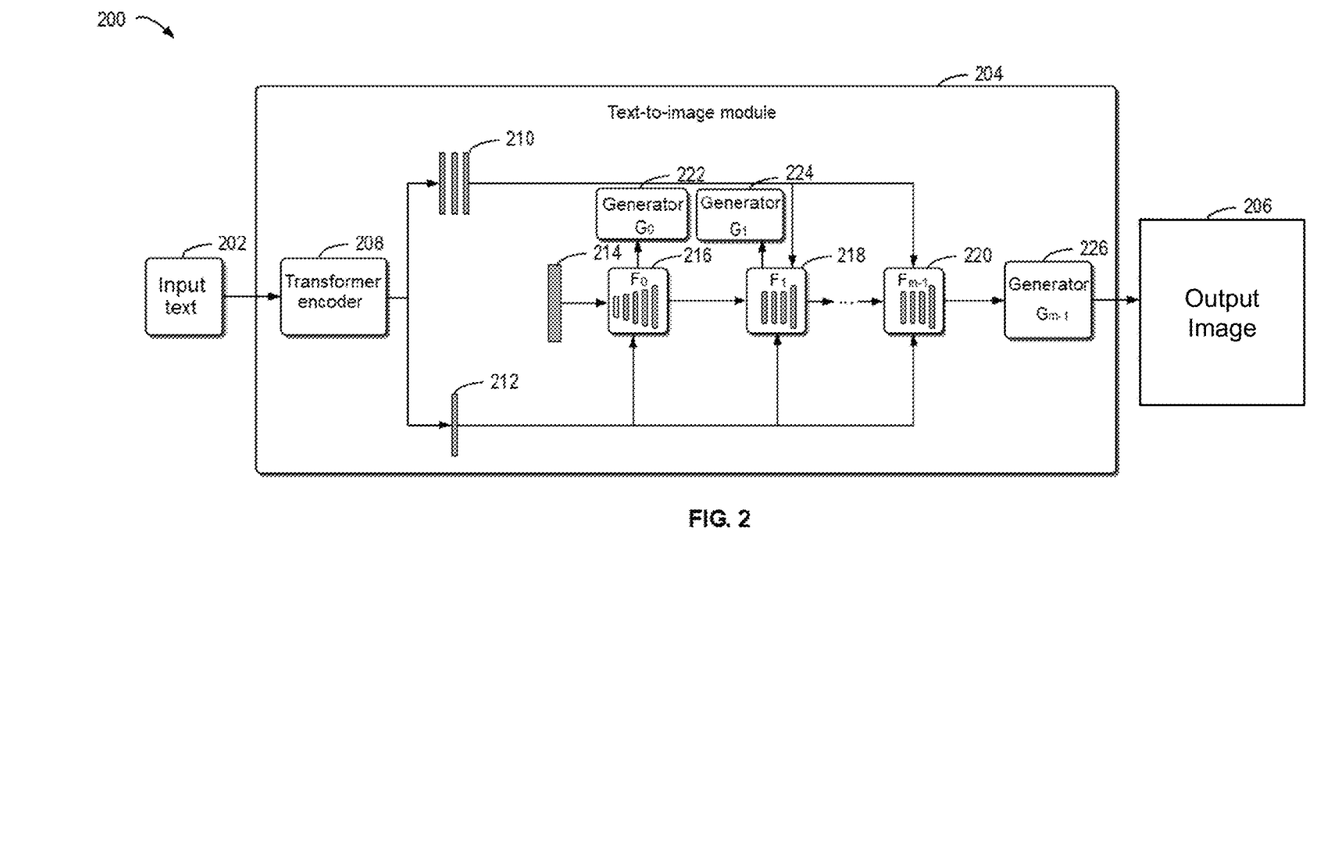
FIG. 2 illustrates a schematic structural diagram of a text-to-image module according to an embodiment of the present disclosure.

As shown in FIG. 2, text-to-image module 204 receives input text 202, and then converts it into image 206 corresponding to the text. Specifically, text-to-image module 204 first converts, through transformer encoder 208, the text into character features 210 for a group of characters in input text 202 and text features 212 for the input text. Character features 210 include the feature for each character in the group of characters in the input text. Text features 212 are features for the overall content of the text.

Next, text features 212 and random noise $z \sim N(0,1)$ 214 are input to the 0th visual feature transformer $F_0$ 216 to obtain initial visual features. At this time, the initial visual features may be input to generator $G_0$ 222 to generate a first image. The obtained initial visual features, character features 210, and text features 212 are then input to first visual feature transformer $F_1$ 218 to calculate first visual features. Then, the first visual features may be input to generator $G_1$ 224 to obtain a second image, and then the first visual features, character features 210, and text features 212 may be input to a next visual feature transformer, and so on, until the last visual feature transformer $F_{m-1}$ 220 generates target visual features. The target visual features are then input to generator $G_{m-1}$ 226 to generate corresponding image 206.

Through this method, a corresponding image may be generated quickly from text, thereby improving the accuracy of generating an image from text, and improving the efficiency of data processing.

Figure 3:
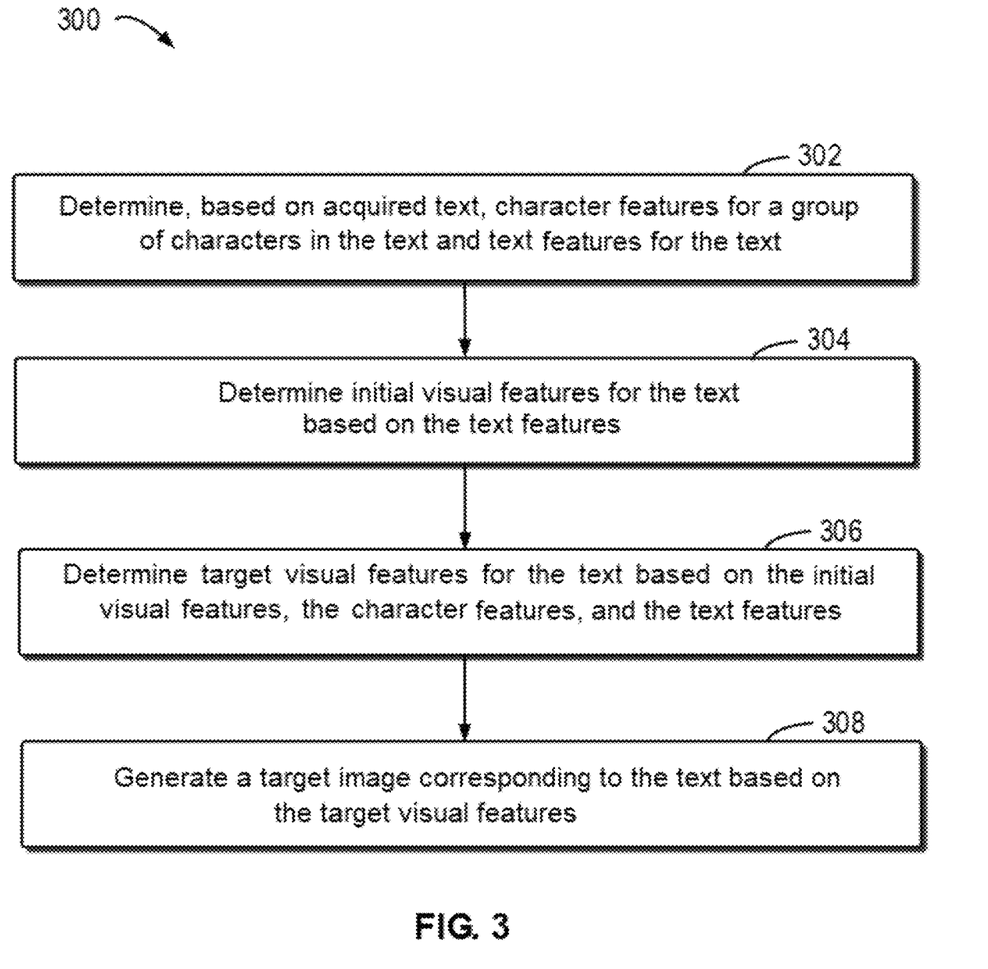
FIG. 3 illustrates a flow chart of a method for processing data according to an embodiment of the present disclosure.

FIG. 2 above describes a schematic structural diagram of the text-to-image module 204 according to an embodiment of the present disclosure. A schematic diagram of data processing is further described below with reference to FIG. 3, in which FIG. 3 illustrates a flow chart of a method 300 for processing data according to an embodiment of the present disclosure. The method 300 in FIG. 3 may be performed on computing device 104 in FIG. 1 or any suitable computing device.

At block 302, computing device 104 determines, based on acquired text, character features for a group of characters in the text and text features for the text. When the text is processed, the computing device needs to determine the character features and the text features of the text first. The character features are formed by the feature of each character in the text, and the text features are the features of the whole text.

In some embodiments, while the character features and the text features are determined, computing device 104 first determines an initial feature for each character in the group of characters. For example, computing device 104 first determines an embedding vector of each character in the text, and then takes it as the initial feature of the character. Computing device 104 then recalculates the character features by using the initial feature of each character and the correlation degrees between the character and other characters in the group of characters in the input text. In this process, the correlation degree is determined by dot product of a first vector obtained from the initial feature of each character with a second vector obtained from the initial feature of another character. Next, computing device 104 combines the feature of another character into the feature of each character according to the correlation degree between the character and the other character to obtain the character features. Computing device 104 determines the text features based on the initial feature and the correlation degree between the whole text and each character in the group of character. While the text features are calculated, the initial feature of each character and its correlation degree with the whole text are used to calculate the text features. For example, as shown in FIG. 2, text-to-image module 204 obtains character features 210 and text features 212 in input text 202 through the transformer encoder. Through this method, the character features and text features of the text may be quickly and accurately determined, and the efficiency of acquiring feature information may be improved.

An example of acquiring character features 210 and text features 212 is described below. For input text $T=\{T_l|l=0,\ldots,L-1\}$, L is the number of text characters, and $T_l$ denotes the lth character in the text. As shown in the following Equation (1), after input text T is processed by the transformer encoder, character features w and text features S are obtained:

$$w,s=\text{Transformer}(T) \quad (1)$$

where $w=\{w^l|l=0,\ldots,L-1\}\in R^{D\times L}$ is a combination of $w^l$ in a hidden state of each word, where D and L denote dimensions of the vector space, and $s\in R^D$ is the last hidden state for the whole text.

Alternatively or additionally, determining the character features and the text features further includes: performing linear transformation on the text features to obtain adjusted text features. For example, for obtained text feature S, in order to distinguish text feature S from a text feature with similar semantics, text feature S may be enhanced. For example, the following Equation (2) is used to enhance text feature S to obtain an enhanced text feature:

$$S_{ca}=F_{sa}(s) \quad (2)$$

where $F_{sa}(\cdot)$ is an enhancement function, which may be a linear function, and $S_{ca}\in R^{D'}$, where D' is the dimension after the enhancement.

In some embodiments, text-to-image module 204 may obtain character features and text features of input text through a Bidirectional Encoder Representation from Transformers (BERT) model. The above examples are intended to describe the present disclosure only and are not specific limitations to the present disclosure.

At block 304, computing device 104 determines initial visual features for the text based on the text features. After the text features are obtained, initial features for the input text may be calculated first according to the text features. In one example, computing device 104 generates initial visual features based on the text features and random parameters. As shown in FIG. 2, random noise 214 and text features 212 may be input to the 0th visual feature transformer $F_0$ 216 to obtain the initial visual features.

At block 306, computing device 104 determines target visual features for the text based on the initial visual features, the character features, and the text features. After the initial visual features are determined, the character features and the text features are combined with them to obtain the target visual features.

In some embodiments, computing device 104 uses the initial visual features and the character features to determine character context features. Computing device 104 then uses the initial visual features and the text features to determine text context features. Next, computing device 104 uses the character context features, the text context features, and the initial visual features to determine reference visual features. Finally, the computing device uses the reference visual features to determine the target visual features. Through this method, the target visual features may be determined quickly and accurately.

Alternatively or additionally, when the computing device uses the reference visual features to determine the target visual features, the reference visual features are updated based on the character context features and the text context features, and then the process is repeated for a predetermined number of times to determine the last reference visual features as the target visual features.

For example, $\{F_0, F_1, \ldots, F_{m-1}\}$ denotes m visual feature generators, $\{G_0, G_1, \ldots, G_{m-1}\}$ denotes m image generators, and initial visual feature $f_0$, visual feature $f_i$ generated in each subsequent stage, and the generated image $I_i$ are obtained from the following Equation (3):

$$f_0=F_0(z,S_{ca})$$

$$f_i=F_i(f_{i-1},F_{att_i}(f_{i-1},w,s_{ca})),i\in\{1,2,\ldots,m-1\} \quad (3)$$

$$I_i=G_i(f_i),i\in\{1,2,\ldots,m-1\}$$

where $z\sim N(0,1)$ is random noise, $f_i\in R^{M_i\times N_i}$ is the output of ith visual feature generator $F_i$, $M_i$ and $N_i$ denotes the spatial dimension of $f_i$, $I_i\in R^{q_i\times q_i}$ is an image output by the ith image generator, and $q_i$ denotes the spatial dimension of $I_i$. In addition, $F_{att_i}$ is a global and local collaborative attention model, which includes two parts character context feature $\text{Att}_{i-1}^w$ and text context feature $\text{Att}_{i-1}^s$, for example, $F_{att_i}(f_{i-1},w,s_{ca})=\text{contact}(\text{Att}_{i-1}^w,\text{Att}_{i-1}^s)$, where contact $(\cdot)$ denotes a connection function.

Character context feature $\text{Att}_{i-1}^w$ is calculated through an attention model at the character level. In this process, character feature w is transformed from perceptual layer $U_{i-1}$ to underlying universal semantic space $U_{i-1}^w$ of a visual feature, and then multiplied with visual feature $f_{i-1}$ to obtain an attention score. Finally, as shown in the following Equation (4), the character context feature $U_{i-1}w$ is calculated by calculating an inner product of the attention score and $\text{Att}_{i-1}^w$:

$$\text{Att}_{i-1}^w=\Sigma_{l=0}^{L-1}(U_{i-1}w^l)(\text{softmax}(f_{i-1}^T(U_{i-1}w^l)))^T \quad (4)$$

where $U_{i-1} \in R^{M_{i-1} \times D}$, $Att_{i-1}^w \in R^{M_{i-1} \times N_{i-1}}$, $M_{i-1}$, $D$ and $N_{i-1}$ denote spatial dimensions, and T denotes transposition. $Att_{i-1}^w$ has the same dimension as that of visual feature $f_{i-1}$, which is further used for generating ith visual feature $f_i$ in combination with $f_{i-1}$.

Global constraints on the generator are implemented during generation through a text-level model. Similar to the character-level attention model, enhanced text feature $S_{ca}$ is first transformed into underlying universal semantic space $V_{i-1}$ of a visual feature through perceptual layer $V_{i-1}S_{ca}$. Then, it is multiplied by visual feature $f_{i-1}$ to obtain an attention score. Finally, as shown in the following Equation (5), the attention text context feature $Att_{i-1}^s$ is obtained by calculating the product of the attention score and $V_{i-1}S_{ca}$:

$$Att_{i-1}^s = (V_{i-1}S_{ca}) \circ (\text{softmax}(f_{i-1} \circ (V_{i-1}S_{ca}))) \quad (5)$$

where $\circ$ denotes the multiplication at the element level, $V_{i-1} \in R^{M_{i-1} \times D'}$, $Att_{i-1}^s \in R^{M_{i-1} \times N_{i-1}}$, and where $M_{i-1}$, $D'$, and $N_{i-1}$ denote spatial dimensions. Attention text context feature $Att_{i-1}^w$ is further combined with $f_{i-1}$ and $Att_{i-1}^w$ to generate the ith visual feature $f_i$.

At block 308, computing device 104 generates a target image corresponding to the text based on the target visual features. After the target visual features for the text are obtained, the target image may be generated based on an image generator. A training process of the text-to-image module will be described later with reference to method 500 of FIG. 5 and diagram 600 of FIG. 6. Through this method, a corresponding image may be generated quickly from text, thereby improving the accuracy of generating an image from text, and improving the efficiency of data processing.

Further, computing device 104 may also perform a process of generating text from an image, as shown in FIG. 1, in which image 108 is generated into text 110 by image-to-text module 114.

Computing device 104 may acquire an image, such as a generated target image. Then, the computing device generates image visual features for the target image based on the target image. Then, the computing device uses the image visual features to determine features of characters related to the target image. Finally, computing device 104 generates target text corresponding to the target image based on the features of characters related to the target image. Through this method, text corresponding to an image may be quickly acquired, and the image may be quickly compressed. An example of an image-to-text module is further described below with reference to FIG. 4, wherein FIG. 4 illustrates a schematic structural diagram 400 of an image-to-text module 404 according to an embodiment of the present disclosure.

Figure 4:
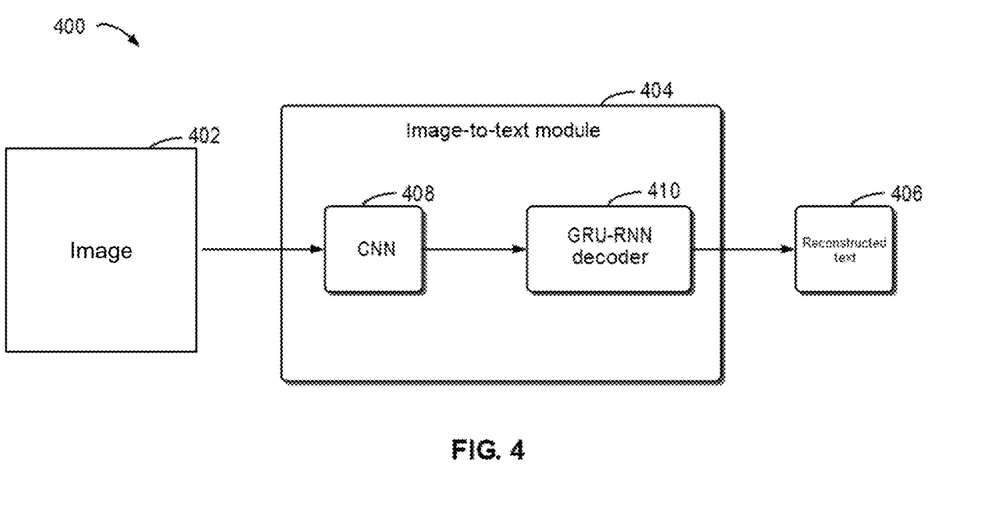
FIG. 4 illustrates a schematic structural diagram of an image-to-text module according to an embodiment of the present disclosure.

As shown in FIG. 4, image-to-text module 404 transforms image 402 into reconstructed text 406. Image-to-text module 404 includes Convolutional Neural Network (CNN) encoder 408, which transforms image 402 into visual features. Then, the visual features are input to Gated Recurrent Unit-Recurrent Neural Networks (GRU-RNN) decoder 410 for processing, so as to generate the reconstructed text.

For example, image $I_{m-1}$ generated by the final image generator is sent to the CNN encoder 408 and the GRU-RNN decoder 410 to generate the corresponding text, which is obtained from the following Equation (6):

$$x_{-1} = \text{CNN}(I_{m-1})$$

$$x_t = W_e T_t, t \in \{0, \ldots, L-1\} \quad (6)$$

$$P_{t+1} = \text{GRU RNN}(x_t), t \in \{0, \ldots, L-1\}$$

where $x_{-1} \in R^{M_{m-1}}$ denotes the visual feature used as the starting stage, $M_{m-1}$ denotes the spatial dimension, $W_e$ denotes a character vector matrix, which maps character features to visual feature spaces, $T_t$ is the predicted character, $T_0$ is obtained from $x_{-1}$, and $P_{t+1}$ is a probability distribution of the predicted character.

As described above, the determination of the initial visual features, the target visual features, and the target image is realized by a text-to-image model, and the generation of the image visual features, the features of characters related to the target image, and the target text is realized by an image-to-text model. The sample text and the sample image corresponding to the sample text may be used for jointly training the text-to-image model and the image-to-text model. For example, the text-to-image model may be implemented by a Generative Adversarial Network (GAN). The image-to-text model may be implemented through CNN and GRU-RNN models. The above is only an example, rather than a specific limitation to the present disclosure. Those skilled in the art may adopt any suitable method and model for implementation. In this way, the accuracy of the model may be improved, and the efficiency of model training may be improved. The process of joint training of the models is described with reference to FIG. 5 and FIG. 6, and the process may be performed on computing device 104 of FIG. 1 and any suitable computing device.

Figure 5:
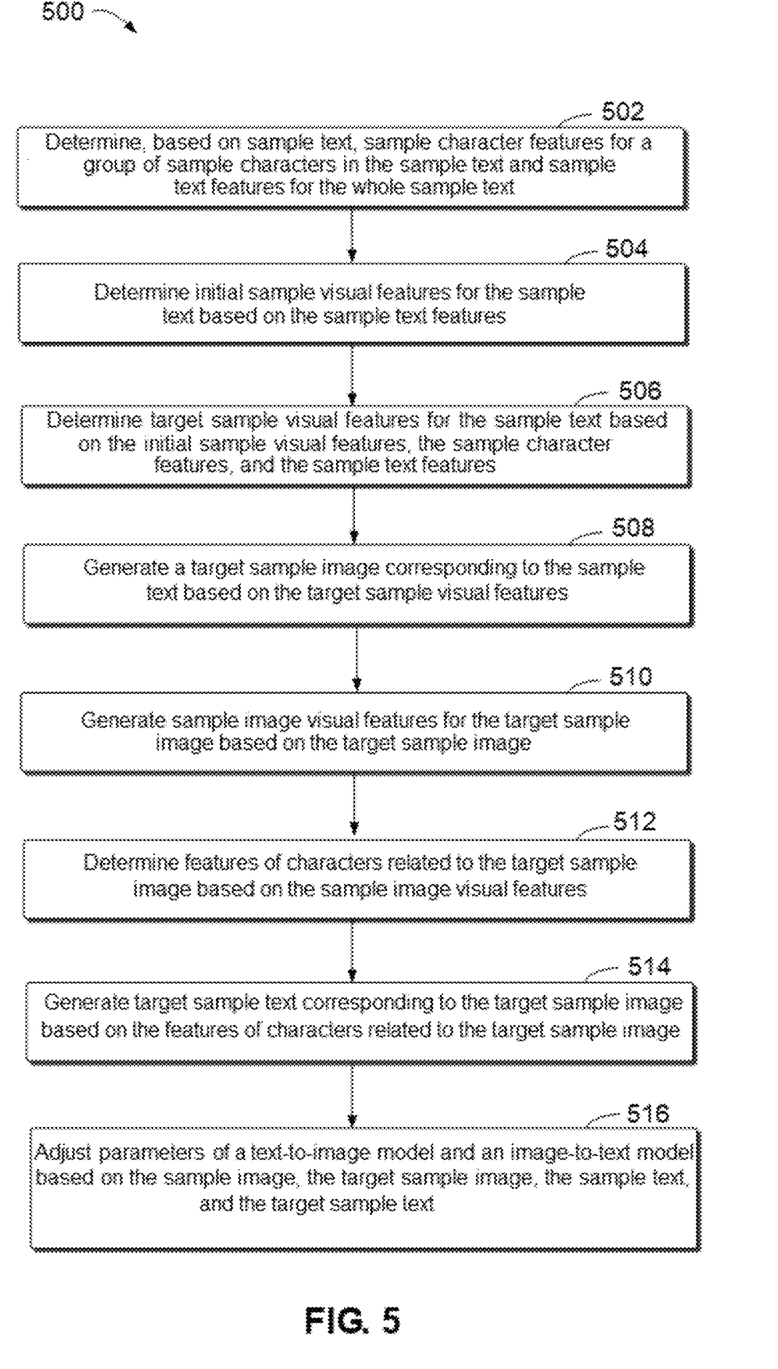
FIG. 5 illustrates a flow chart of a method for training a model according to an embodiment of the present disclosure.
Figure 6:
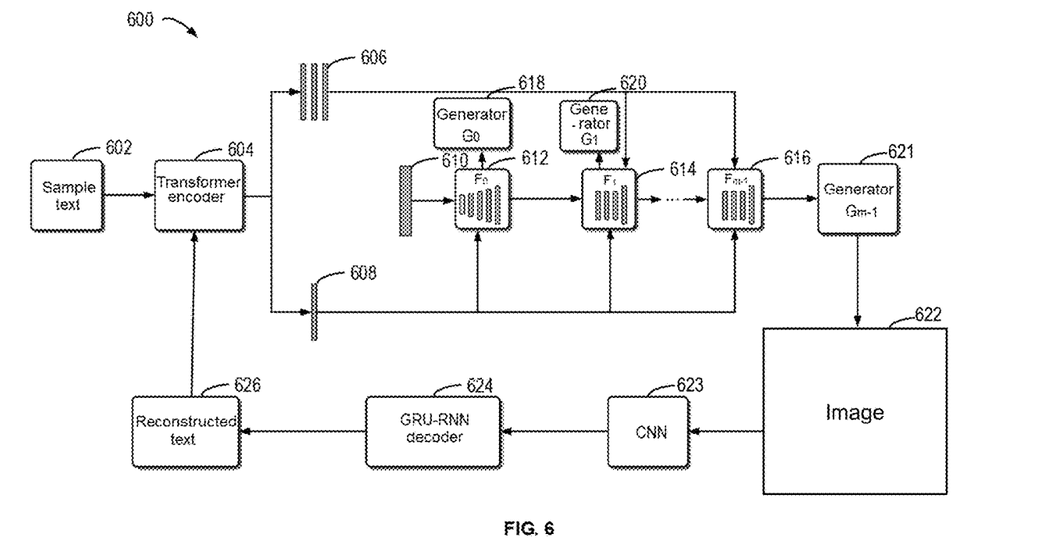
FIG. 6 illustrates a schematic structural diagram showing the training of a model according to an embodiment of the present disclosure.

At block 502, computing device 104 determines, based on sample text, sample character features for a group of sample characters in the sample text and sample text features for the whole sample text. For example, as shown in FIG. 6, sample text 602 is input to transformer encoder 604 to obtain sample character feature 606 and sample text feature 608. Transformer encoder 604 may be trained in advance.

Returning to FIG. 5, at block 504, computing device 104 determines initial sample visual features for the sample text based on the sample text features. As shown in FIG. 6, the initial sample visual features are obtained by inputting sample text features 608 and random noise 610 into visual feature generator $F_0$ 612.

At block 506, computing device 104 determines target sample visual features for the sample text based on the initial sample visual features, the sample character features, and the sample text features. In FIG. 6, the initial sample visual features are input to image generator $G_0$ 618 and visual feature generator $F_1$ 614, respectively. Visual feature generator $F_1$ 614 further uses sample character feature 606 and sample text feature 608 to calculate sample visual feature $f_1$. Sample visual feature $f_1$ is then input to image generator $G_1$ 620. By analogy, the following visual feature generator uses the output of the previous visual feature generator as well as sample character feature 606 and sample text feature 608 to generate a corresponding visual feature until the last visual feature generator $F_{m-1}$ 616. The visual feature generated by the last visual feature generator $F_{m-1}$ 616 is used as the target sample visual feature.

Returning to FIG. 5, at block 508, computing device 104 generates a target sample image corresponding to the sample text based on the target sample visual feature. As shown in FIG. 6, the last visual feature generator $F_{m-1}$ 616 inputs the generated visual feature into image generator $G_{m-1}$ 621 to generate image 622.

At block 510, computing device 104 generates sample image visual features for the target sample image based on the target sample image. As shown in FIG. 6, sample image visual features corresponding to image 622 are generated by CNN encoder 623.

At block 512, computing device 104 determines features of characters related to the target sample image based on the sample image visual features. At block 514, computing device 104 generates target sample text corresponding to the target sample image based on the features of characters related to the target sample image. As shown in FIG. 6, GRU-RNN decoder 624 is used for generating reconstructed text 626 related to the target sample image.

At block 516, the computing device adjusts parameters of the text-to-image model and the image-to-text model based on the sample image, the target sample image, the sample text, and the target sample text.

In the training process of the two models, there are two types of adversarial losses: visual reality adversarial loss and text image pairing semantic consistency adversarial loss. At each training stage, generator G and discriminator D are trained alternately. In particular, generator $G_i$ in the ith stage is trained by minimizing losses, as shown in Equation (7) below:

$$L_{G_i} = -\frac{1}{2}E_{I_i \sim p(I_i)}[\log(D_i(I_i))] - \frac{1}{2}E_{I_i \sim p(I_i)}[\log(D_i(I_i, s))] \quad (7)$$

where S is the text feature, $I_i$ is the generated image sampled from distribution $p(I_i)$ of the ith stage, $E_{I_i \sim p(I_i)}$ is an expected value, the first item is the visual reality adversarial loss, which is used for distinguishing whether the image is visually real or false, and the second item is the text-image pairing semantic consistency adversarial loss, which is used for determining whether the underlying image and sentence semantics are consistent.

In addition, a text semantic reconstruction loss is also calculated to align the generated text with the given text. Mathematically, this loss may be obtained from Equation (8):

$$L_{rec} = -\Sigma_{t=0}^{L-1} \log P_t \quad (8)$$

where $p_t$ denotes a probability that the calculated character is a sample character. When generator $G_i$ is being trained, the gradient from $L_{rec}$ is propagated back to $G_i$, and its network weight remains constant. The final objective loss function $L_G$ is expressed by Equation (9):

$$L_G = \Sigma_{i=0}^{m-1} L_{G_i} + \lambda L_{rec} \quad (9)$$

where $\lambda$ is a loss weight to deal with the importance of adversarial loss and text semantic reconstruction loss.

Figure 7:
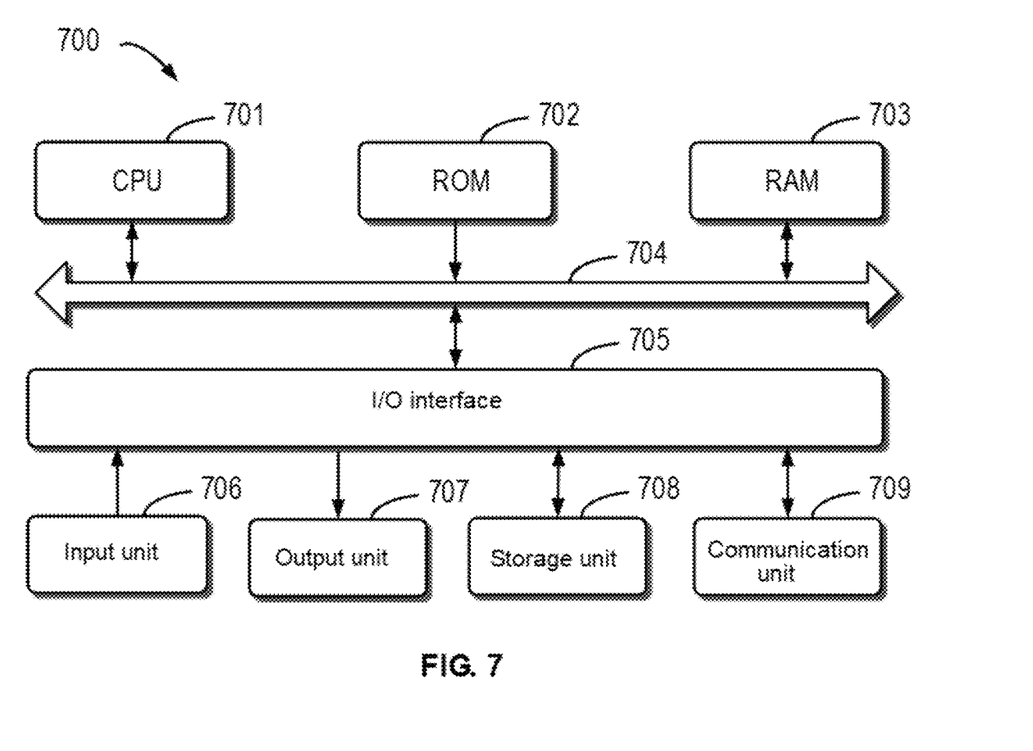
FIG. 7 illustrates a schematic block diagram of an example device suitable for implementing an embodiment of the present disclosure.

FIG. 7 shows a schematic block diagram of example device 700 that can be used to implement embodiments of the present disclosure. Computing device 104 in FIG. 1 may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

Various processes and processing described above, e.g., methods 300 and 500, may be executed by CPU 701. For example, in some embodiments, methods 300 and 500 may be embodied as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more actions of methods 300 and 500 described above can be implemented.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for processing data, comprising:
   determining, based on acquired text, character features for a group of characters in the text and text features for the text;
   determining initial visual features for the text based on the text features;
   determining target visual features for the text based on the initial visual features, the character features, and the text features;
   generating a target image corresponding to the text based on the target visual features;
   generating image visual features for the target image based on the target image;
   determining features of characters related to the target image based on the image visual features; and
   generating target text corresponding to the target image based on the features of characters related to the target image.

2. The method according to claim 1, wherein determining the character features and the text features comprises:
   determining an initial feature for each character in the group of characters;
   determining the character features based on the initial feature and correlation degrees between the character and other characters in the group of characters; and
   determining the text features based on the initial feature and the correlation degree between the whole text and each character in the group of characters.

3. The method according to claim 2, wherein determining the character features and the text features further comprises:
   performing linear transformation on the text features to obtain adjusted text features.

4. The method according to claim 1, wherein determining the initial visual features comprises:
   generating the initial visual features based on the text features and random parameters.

5. The method according to claim 1, wherein the determination of the initial visual features, the target visual features, and the target image is realized by a text-to-image model, and the generation of the image visual features, the features of characters related to the target image, and the target text is realized by an image-to-text model.

6. The method according to claim 5, further comprising: jointly training the text-to-image model and the image-to-text model by using sample text and a sample image corresponding to the sample text.

7. The method according to claim 6, wherein jointly training the text-to-image model and the image-to-text model by using the sample text and the sample image corresponding to the sample text comprises:
  determining, based on the sample text, sample character features for a group of sample characters in the sample text and sample text features for the whole sample text;
  determining initial sample visual features for the sample text based on the sample text features;
  determining target sample visual features for the sample text based on the initial sample visual features, the sample character features, and the sample text features;
  generating a target sample image corresponding to the sample text based on the target sample visual features;
  generating sample image visual features for the target sample image based on the target sample image;
  determining features of characters related to the target sample image based on the sample image visual features;
  generating target sample text corresponding to the target sample image based on the features of characters related to the target sample image; and
  adjusting parameters of the text-to-image model and the image-to-text model based on the sample image, the target sample image, the sample text, and the target sample text.

8. A method for processing data, comprising:
  determining, based on acquired text, character features for a group of characters in the text and text features for the text;
  determining initial visual features for the text based on the text features;
  determining target visual features for the text based on the initial visual features, the character features, and the text features; and
  generating a target image corresponding to the text based on the target visual features;
  wherein determining the target visual features comprises:
  determining character context features based on the initial visual features and the character features;
  determining text context features based on the initial visual features and the text features;
  determining reference visual features based on the character context features, the text context features, and the initial visual features; and
  determining the target visual features based on the reference visual features.

9. The method according to claim 8, wherein determining the target visual features based on the reference visual features comprises:
  determining the reference visual features as the target visual features by iteratively performing the following operation for a predetermined number of times:
  updating the reference visual features based on the character context features and the text context features.

10. An electronic device, comprising:
  at least one processor; and
  memory coupled to the at least one processor and having instructions stored therein, wherein the instructions, when executed by the at least one processor, cause the electronic device to perform actions comprising:
  determining, based on acquired text, character features for a group of characters in the text and text features for the text;
  determining initial visual features for the text based on the text features;
  determining target visual features for the text based on the initial visual features, the character features, and the text features;
  generating a target image corresponding to the text based on the target visual features;
  generating image visual features for the target image based on the target image;
  determining features of characters related to the target image based on the image visual features; and
  generating target text corresponding to the target image based on the features of characters related to the target image.

11. The electronic device according to claim 10, wherein determining the character features and the text features comprises:
  determining an initial feature for each character in the group of characters;
  determining the character features based on the initial feature and correlation degrees between the character and other characters in the group of characters; and
  determining the text features based on the initial feature and the correlation degree between the whole text and each character in the group of characters.

12. The electronic device according to claim 11, wherein determining the character features and the text features further comprises:
  performing linear transformation on the text features to obtain adjusted text features.

13. The electronic device according to claim 10, wherein determining the initial visual features comprises:
  generating the initial visual features based on the text features and random parameters.

14. The electronic device according to claim 10, wherein determining the target visual features comprises:
  determining character context features based on the initial visual features and the character features;
  determining text context features based on the initial visual features and the text features;
  determining reference visual features based on the character context features, the text context features, and the initial visual features; and
  determining the target visual features based on the reference visual features.

15. The electronic device according to claim 14, wherein determining the target visual features based on the reference visual features comprises:
  determining the reference visual features as the target visual features by iteratively performing the following operation for a predetermined number of times:
  updating the reference visual features based on the character context features and the text context features.

16. The electronic device according to claim 10, wherein the determination of the initial visual features, the target visual features, and the target image is realized by a text-to-image model, and the generation of the image visual features, the features of characters related to the target image, and the target text is realized by an image-to-text model.

17. The electronic device according to claim 16, wherein the actions further comprise:
jointly training the text-to-image model and the image-to-text model by using sample text and a sample image corresponding to the sample text.

18. A computer program product tangibly stored on a non-transitory computer-readable medium and comprising machine-executable instructions, wherein the machine-executable instructions, when executed by a machine, cause the machine to perform actions comprising:
determining, based on acquired text, character features for a group of characters in the text and text features for the text;
determining initial visual features for the text based on the text features;
determining target visual features for the text based on the initial visual features, the character features, and the text features;
generating a target image corresponding to the text based on the target visual features;
generating image visual features for the target image based on the target image;
determining features of characters related to the target image based on the image visual features; and
generating target text corresponding to the target image based on the features of characters related to the target image.

19. The computer program product according to claim 18, wherein the determination of the initial visual features, the target visual features, and the target image is realized by a text-to-image model, and the generation of the image visual features, the features of characters related to the target image, and the target text is realized by an image-to-text model.

20. The computer program product according to claim 19, wherein the actions further comprise:
jointly training the text-to-image model and the image-to-text model by using sample text and a sample image corresponding to the sample text.

* * * * *